United States Patent Office 3,526,633
Patented Sept. 1, 1970

3,526,633
SUBSTITUTED 2,4,5,6-TETRAHYDRO-
PYRROLO[3,4-c]PYRAZOLES
Shreekrishna Manmohan Gadekar, Trenton, and Bernard
Dean Johnson, Montvale, N.J., and Elliott Cohen,
Pearl River, N.Y., assignors to American Cyanamid
Company, Stamford, Conn., a corporation of Maine
No Drawing. Filed Mar. 6, 1968, Ser. No. 710,778
Int. Cl. C07d 31/34, 31/42
U.S. Cl. 260—295                                         2 Claims

ABSTRACT OF THE DISCLOSURE

This disclosure describes compounds of the class of substituted 2,4,5,6-tetrahydropyrrolo[3,4-c]pyrazoles useful as central nervous system depressants.

BRIEF SUMMARY OF THE INVENTION

This invention relates to new organic compounds and, more particularly, is concerned with novel substituted 2,4,5,6-tetrahydropyrrolo[3,4-c]pyrazoles and methods of preparing these compounds. The novel compounds of the present invention may be represented by the following general formula:

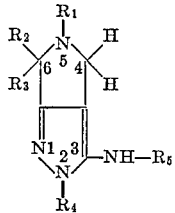

wherein $R_1$ is lower alkanoyl, lower alkoxycarbonyl or benzoyl; $R_2$ is hydrogen or lower alkyl; $R_3$ is hydrogen or lower alkyl; $R_4$ is lower alkyl, phenyl lower alkyl, phenyl tolyl, halophenyl, dihalophenyl, halotolyl, lower alkoxyphenyl, pyridyl, quinolyl, 2-benzimidazolyl, 2-benzoxazolyl or 2-benzothiazolyl; and $R_5$ is hydrogen, lower alkanoyl, 2,2,2-trifluoroacetyl or 3,4,5-trimethoxybenzoyl. Suitable lower alkyl, lower alkanoyl and lower alkoxycarbonyl groups contemplated by the present invention are those having up to 4 carbon atoms such as methyl, ethyl, isopropyl, n-butyl, formyl, acetyl, propionyl, isobutyryl, carbomethoxy, carbethoxy, carboispropoxy, etc. Phenyl lower alkyl is exemplified by benzyl, α-phenylethyl, β-phenylethyl and the ike. Tolyl is o-, m- or p-tolyl and typical halotolyl groups may be, for example, m-chloro-o-tolyl, m-bromo-p-tolyl, o-chloro-p-tolyl, p-fluoro-m-tolyl, etc. Suitable halophenyl and dihalophenyl groups are, for example, o-bromophenyl, m-chlorophenyl, p-fluorophenyl, 3,4-dichlorophenyl, 2-chloro-4-fluorophenyl, 3-bromo-5-chlorophenyl, and the like. Suitable lower alkoxyphenyl groups may be, for example, o-methoxyphenyl, m-ethoxyphenyl, p-isopropoxyphenyl, etc. Pyridyl and quinolyl are exemplified by 2-pyridyl, 3-jyridyl, 4-pyridly, 2-quinolyl, 4-quinolyl, 6-quinolyl, 8-quinolyl, etc. Halogen may be flouro, chloro bromo or iodo.

DETAILED DESCRIPTION OF THE INVENTION

The novel compounds of the present invention are generally obtainable as white to tan crystalline materials having characteristic melting points and absorption spectra. The free bases are appreciably soluble in such solvents as methanol, ethanol and dimethylformamide but relatively less soluble in such solvents as benzene and toluene. They are, however, generally insoluble in water.

The free bases of this invention form acid-addition salts with a variety of organic and inorganic self-forming reagents. Thus acid-addition salts, formed by admixture of the organic free base with an equivalent amount of an acid, suitably in a neutral solvent, are formed with such acids as sulfuric, phosphoric, hydrochloric, hydrobromic, citric, lactic, tartaric, actic, gluconic, ascorbic, and the like and the acid-addition salts so formed are soluble in water. For purposes of this invention, the organic free bases are equivalent to their acid-addition salts.

The novel substituted 2,4,5,6-tetrahydropyrrolo[3,4-c]-pyrazoles of the present invention may be readily prepared by a sequence of reactions as illustrated in the following reaction scheme:

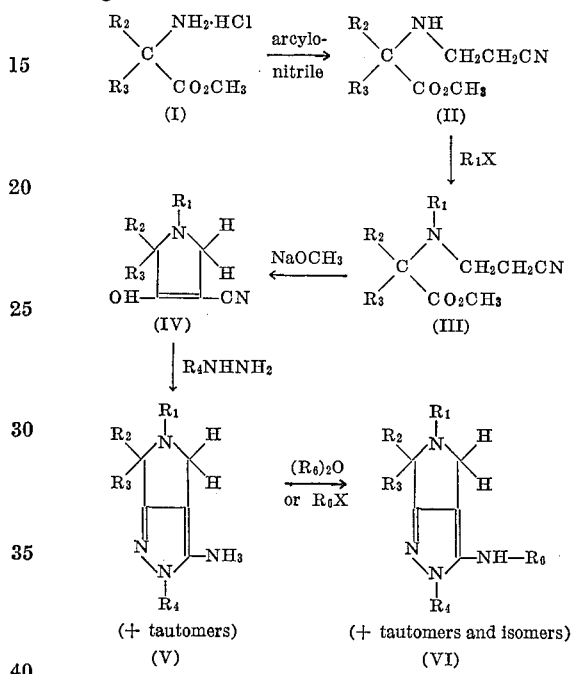

wherein $R_1$, $R_2$, $R_3$ and $R_4$ are as hereinabove defined and $R_6$ is lower alkanoyl, 2,2,2-trifluoroacetyl or 3,4,5 - trimethoxybenzoyl.

In accordance with the above reaction scheme, a condensation reaction of an appropriately substituted methyl gylcinate hydrochloride (I) with acrylonitrile produces the corresponding methyl N-(2-cyanoethyl)glycinate (II). Acylation of (II) with $R_1X$ (a lower alkanoyl halide, a lower alkyl halocarbonate or a benzoyl halide) under conditions described in the examples forms the corresponding methyl N-acyl-N-(2-cyanoethyl)-glycinate (III). Ring closure of compound (III) with sodium methylate in benzene at the reflux temperature for from 2 to 4 hours forms the corresponding N-acyl-4-cyano-3-pyrrolidone (IV). The conversion of the N-acyl-4-cyano-3-pyrrolidone derivatives (IV) to the corresponding 3-amino-2,4,5,6-tetrahydropyrrolo-[3,4-c]pyrazoles (V) of the present invention may be readily accomplished by treating an appropriately substituted N-acyl-4 cyano-3-pyrrolidone (IV) with a substituted hydrazine of the formula $$R_4NHNH_2.$$

When the hydrazine bases ($R_4NHNH_2$) are used, acetic acid is conveniently employed as the solvent. When the hydrazines are available in the form of acid-addition salts, such as the hydrochloride, these salts may be condensed with the N-acyl-4-cyano-3-pyrrolidone intermediates (IV) in acetic acid or a solvent such as ethanol, propanol, and the like. The temperature range employed is from about 50° C. to about 125° C. with the preferred range being 80°–125° C. The reaction is conveniently carried out by heating on the steam bath or at the refluxing temperature of the solvent, and is substantially complete within about one hour to several hours or more. The products are isolated and purified by standard procedures well known to those skilled in the art. Acylation of (V) with $(R_6)_2O$ (a lower alkanoic anhydride, 2,2,2-trifluoroacetic anhydride or 3,4,5-trimethoxybenzoic anhydride) or with $R_6X$ (a lower alkanoyl halide, a 2,2,2-trifluoroacetyl halide or a 3,4,5-trimethoxybenzoyl halide) under conditions described in the example yields the corresponding acylated products (VI) of the present invention.

The novel substituted 2,4,5,6-tetrahydropyrrolo[3,4-c]-pyrazoles of the present invention may exist in other tautomeric and isomeric forms as follows:

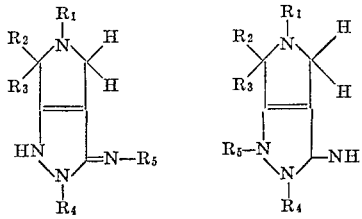

wherein $R_1$, $R_2$, $R_3$, $R_4$ and $R_5$ are as hereinabove defined. All such tautomeric and isomeric forms of the substituted 2,4,5,6-tetrahydropyrrolo[3,4-c]pyrazoles are, therefore, included within the purview of the present invention and the description of one form is intended to include the tautomers and isomers thereof.

The substituted 2,4,5,6-tetrahydropyrrolo[3,4-c]pyrazoles of the present invention are active central nervous system depressants when measured by the "rod walking" test for reduced motor activity in mice as described by Gray et al., Archives Internationales de Pharmacodynamie et de Therapie, vol. 125, p. 101 (1960) and vol. 134, p. 198 (1961), with modifications. This method is carried out according to the following test procedure. The compounds studied were administered intraperitoneally in a 2% starch vehicle to groups of six mice at three or more graded dose levels. At 15-minute and 30-minute intervals after treatment, each animal was placed on the midpoint of a horizontal steel rod (1.55 cm. in diameter and about 6 dm. in length), positioned 45.7 cm. above the surface of the table, and forced to walk toward a platform at either end of the rod. The criterion of inability to perform this act was consistent slipping to the side or falling off the rod. Effective doses for reduced rod-walking ability ($RWD_{50}$) were calculated or approximated from the data, and the time of peak effect was estimated from the data. One-half of the $RWD_{50}$ dose was given intraperitoneally to each mouse in groups of five. At the time of peak effect, as determined above, each group of mice was put into the actophotometer for a period of five minutes and the motor activity counts were recorded and compared to controls. Those compounds that appeared to reduce motor activity by 50% were administered to additional groups of five mice at graded doses and tested similarly. The dose ($MDD_{50}$) that caused a 50% reduction in motor activity was estimated. In a representative operation, and merely by way of illustration, 5-carbethoxy-3-acetylamino-2 - (2 - pyridyl)-2,4,5,6-tetrahydropyrrolo[3,4-c]pyrazole was shown to induce ataxia ($RWD_{50}$) at >100 mg./kg. of body weight and to reduce locomotor activity ($MDD_{50}$) at 9.2 mg./kg. of body weight when tested according to the above procedure.

The invention will be described in greater detail in conjunction with the following specific examples.

Example 1.—Preparation of 5-carbethoxy-3-amino-2-(m-chlorophenyl)-2,4,5,6-tetrahydropyrrolo[3,4-c]pyrazole A mixture containing 2.0 g. (0.01 mole) of 1-carbethoxy-4-cyano-3-pyrrolidone monohydrate, 1.8 g. (0.01 mole) m-chlorophenylhydrazine hydrochloride and 30 ml. of ethanol was heated for 5 hours. The resultant clear-red solution was evaporated to a brown gum which was dissolved in 25 ml. of dimethylformamide. From the solution on standing at room temperature, a light yellow solid separated which was collected and dried; M.P. 177–179° C.; 1.05 g. (36%).

Example 2.—Preparation of 5-carbethoxy-3-amino-2-phenyl-2,4,5,6-tetrahydropyrrolo[3,4-c]pyrazole A mixture containing 8.0 g. (0.04 mole) of 1-carbethoxy-4-cyano-3-pyrrolidone monohydrate, 5.78 g. (0.04 mole) of phenylhydrazine hydrochloride and 100 ml. of ethanol was refluxed for 5 hours. Ethanol was removed by evaporation and the residue was dissolved in 100 ml. of 5 N HCl. The solution was decolorized with charcoal and the filtrate was rendered basic whereupon the pyrazole precipitated. It was recrystallized from 95% ethanol; M.P. 195–199° C.; 5.8 g. (53.5%).

Example 3.—Preparation of 5-carbethoxy-3-amino-2-(o-methoxyphenyl) - 2,4,5,6 - tetrahydropyrrolo[3,4-c]pyrazole Following the procedure esseentially as in Example 2, from the reaction of 5.0 g. (0.025 mole) of the cyanopyrrolidone and 3.25 g. (0.025 mole) of o-methoxyphenylhydrazine hydrochloride, 1.8 g. (24%) of the product was isolated. It melted at 159–162° C. when recrystallized from aqueous ethanol.

Example 4.—Preparation of 5-carbethoxy-3-amino-2-(p-fluorophenyl) - 2,4,5,6 - tetrahydropyrrolo[3,4 - c]pyrazole Following the procedure essentially as in Example 2, from the reaction of 0.41 g. (0.0025 mole) of p-fluorophenylhydrazine hydrochloride and 0.5 g. (0.0025 mole) of the cyanopyrrolidone was isolated 0.2 g. (29%) of the product, melting at 163–166° C.

Example 5.—Preparation of 5-carbethoxy-3-amino-2-(p-tolyl) - 2,4,5,6 - tetrahydropyrrolo[3,4-c]pyrazole The reaction of 4.0 g. (0.02 mole) of the cyanopyrrolidone with 3.2 g. (0.02 mole) of p-tolyhydrazine hydrochloride by the general procedure outlined in Example 1 afforded 5.4 g. (94%) of the desired compound. A sample recrystallized from ethanol melted at 176–179° C.

Example 6.—Preparation of 5-carbethoxy-3-amino-2-(3-chloro - o - tolyl)-2,4,5,6-tetrahydropyrrolo[3,4-c]pyrazole Following the general procedure outlined in Example 1, this compound was prepared by the reaction of 4.0 g. (0.02 mole) of the cyanopyrrolidone with 3.86 g. (0.02 mole) of 3-chloro-2-methylphenylhydrazine hydrochloride. It weighed 2.7 g. (42%) and melted at 192–194° C. on recrystallization from aqueous ethanol.

Example 7.—Preparation of 5-carbethoxy-3-amino-2-(3, 4-dichlorophenyl) - 2,4,5,6 - tetrahydropyrrolo[3,4-c] pyrazole By applying the general procedure outlined in Example 1, this compound was prepared from 4.0 g. (0.02 mole) of the cyanopyrrolidone and 4.27 g. (0.02 mole) of 3,4-dichlorophenylhydrazine hydrochloride. The product weighed 5.5 g. (73%) and melted at 220–221° C. when recrystallized from ethanol.

Example 8.—Preparation of 5-carbethoxy-3-amino - 2-methyl-2,4,5-tetrahydropyrrolo[3,4-c]pyrazole Following the procedure described in Example 1, this derivative was prepared by causing 2.0 g. (0.01 mole) of the cyanopyrrolidone to react with 1.44 g. (0.01 mole) of methylhydrazine sulfate. The compound weighed 0.21 g. (8%) and melted at 119–125° C. when recrystallized several times from aqueous methanol.

Example 9.—Preparation of 5-carbethoxy-3-amino-2-ethyl-2,4,5,6-tetrahydropyrrolo[3,4-c]pyrazole The reaction of 2.0 g. (0.1 mole) of the cyanopyrrolidone with 1.33 g. (0.01 mole) of ethylhydrazine dihydrochloride by the procedure described in Example 1 provided this product. On one recrystallization from benzene the product melted at 156–157° C. and weighed 1.0 g. (45%).

Example 10.—Preparation of 5-carbethoxy-3-amino-2-(β-phenylethyl)-2,4,5,6-tetrahydropyrrolo[3,4-c]pyrazole The reaction of 5.85 g. (0.25 mole) of phenylethylhydrazine sulfate with 5.0 g. (.25 mole) of the cyanopyrrolidone hydrate as described in Example 1 afforded 2.52 g. (34%) of the product after two recrystallizations from ethanol; M.P. 187–195° C.

Example 11.—Preparation of 6,6-dimethyl-5-carbethoxy-3 - amino - 2 - phenyl-2,4,5,6-tetrahydropyrrolo[3,4-c]pyrazole The reaction of 2.1 g. (0.01 mole) of N-carbethoxy-2,2-dimethyl-4-cyano-3-pyrrolidone with 1.44 g. (0.01 mole) of phenylhydrazine hydrochloride by the general method described in Example 1 gave 2.36 g. (70%) of the product. A sample recrystallized from methanol melted at 166–169° C.

Example 12.—Preparation of 5-acetyl-3-amino-2-phenyl-2,4,5,6-tetrahydropyrrolo[3,4-c]pyrazole The reaction of 1.52 g. (0.01 mole) of N-acetyl-4-cyano-3-pyrrolidone with 1.44 g. (0.01 mole) of phenylhydrazine hydrochloride by a procedure as described in Example 1 gave 0.53 g. (22%) of the desired product. Recrystallized from aqueous alcohol it melted at 222–227° C.

Example 13.—Preparation of 5-carbethoxy-3-amino-2-(2-pyridyl)-2,4,5,6-tetrahydropyrrolo[3,4-c]pyrazole A mixture containing 10.0 g. (0.05 mole) of N-carbethoxy-4-cyano-3-pyrrolidone monohydrate, 5.45 g. (0.05 mole) of 2-hydrazinopyridine, 5.4 ml. of 34% ethanolic HCl (0.05 mole) and 75 ml. of ethanol was refluxed for 5 hours. The solid which had precipitated was filtered off and the filtrate was evaporated to dryness. The solid and the residue were combined, dissolved in 100 ml. of 5 N HCl and 200 ml. of water by warming and the base was precipitated with 10 N NaOHH. The product was isolated by filtering and was recrystallized from 95% ethanol; yield 8.7 (64%) M.P. 217–221° C.

Example 14.—Preparation of 5-carbethoxy-3-amino-2-(8-quinolyl)-2,4,5,6-tetrahydropyrrolo[3,4-c]pyrazole The reaction of 4.0 g. (0.02 mole) of the cyanopyrrolidone with 3.91 g. (0.02 mole) of 8-hydrazinoquinoline hydrochloride by the procedure described in Example 1 gave 1.15 g. (18%) of the desired product melting at 233–239° C. It was recrystallized from methanol.

Example 15.—Preparation of 5-carbethoxy-3-amino-2-(2-benzoxazolyl)-2,4,5,6-tetrahydropyrrolo[3,4-c]pyrazole The reaction of 4.0 g. (0.02 mole) of the cyanopyrrolidone with 3.0 g. (0.02 mole) of 2-hydrazinobenzoxazole by the procedure described in Example 1 afforded 2.1 g. (33%) of the desired product. A twice recrystallized sample from ethanol melted at 272–273° C.

Example 16.—Preparation of 5-carbethoxy-3-amino-2-(2-benzimidazolyl)-2,4,5,6-tetrahydropyrrolo[3,4-c]pyrazole This derivative was obtained by allowing 2.0 g. (0.01 mole) of the cyanopyrrolidone to react with 1.47 g. (0.01 mole) of 2-hydrazinobenzimidazole as described in Example 1. It was recrystallized from dimethylformamide; wt. 0.9 g. (26%); M.P. 279–298° C.

Example 17.—Preparation of 5-carbethoxy-3-amino-2-(2-benzothiazolyl)-2,4,5,6-tetrahydropyrrolo[3,4-c]pyrazole The reaction of 10.0 g. (0.05 mole) of the cyanopyrrolidone and 8.26 g. (0.05 mole) of 2-hydrazinobenzothiazole hydrochloride by the procedure described in Example 1 afforded this derivative. It weighed 17.0 g. (88%) and melted at 282–284° C. when recrystallized from dimethylformamide.

Example 18.—Preparation of 5-carbethoxy-3-acetylamino-2-phenyl-2,4,5,6-tetrahydropyrrolo[3,4-c]pyrazole To a mixture of 1.36 g. (0.005 mole) of 5-carbethoxy-3-amino-2-phenyl - 2,4,5,6 - tetrahydropyrrolo[3,4-c]pyrazole, 0.4 g. of pyridine and 10 ml. of methylene chloride was added a solution of 0.4 g. (0.005 mole) of acetyl chloride in 5 ml. of methylene chloride gradually. The mixture was stirred for 1½ hours and the precipitated hydrochloride was filtered off. The filtrate was concentrated and the residue was recrystallized from aqueous ethanol; 6.0 g. (38%), M.P. 179–183° C.

Example 19.—Preparation of 5-carbethoxy-3-acetylamino-2-(3-chloro-o-tolyl) - 2,4,5,6 - tetrahydropyrrolo[3,4-c]pyrazole A mixture containing 2.4 g. (0.0075 mole) of 5-carbethoxy-3-amino-2-(3-chloro-o-tolyl) - 2,4,5,6-tetrahydropyrrolo[3,4-c]pyrazole and 10 ml. of acetic anhydride was heated over steam for ½ hour. The cooled solution was poured into water and the precipitated gum was recrystallized from aqueous ethanol to give 1.6 g. (58%) of the product melting at 181–183° C.

Example 20.—Preparation of 5-carbethoxy-3-acetylamino-2-(2-pyridyl)-2,4,5,6-tetrahydropyrrolo[3,4-c]pyrazole A mixture of 1.36 g. (0.005 mole) of 5-carbethoxy-3-amino-2-(2 - pyridyl)-2,4,5,6-tetrahydropyrrolo[3,4-c]pyrazole, 0.8 g. (0.01 mole) of pyridine and 20 ml. of methylene chloride was treated gradually with a solution of 0.8 g. (0.01 mole) of acetyl chloride in 5 ml. of methylene chloride. The mixture was stirred for 1½ hours and allowed to stand at room temperature over the weekend. The mixture was evaporated to a residue and recrystallized first from aqueous ethanol and then from benzene. The acylated product melted at 225–229° C.; wt. 1.1 g. (62%).

Example 21.—Preparation of 5-carbethoxy-3-(3,4,5-trimethoxybenzoylamino) - 2-phenyl - 2,4,5,6-tetrahydropyrrolo[3,4-c]pyrazole A mixture of 1.36 g. (0.005 mole) of 5-carbethoxy-3-amino - 2-phenyl - 2,4,5,6-tetrahydropyrrolo[3,4-c]pyrazole, 0.4 g. of pyridine and 20 ml. of methylene chloride was treated with a solution of 1.15 g. (0.005 mole) of 3,4,5-trimethoxybenzoyl chloride in 10 ml. of methylene chloride. After stirring the mixture for 2 hours, it was evaporated to dryness and the residue was recrystallized from ethanol to give 0.95 g. (42%) of the acylated product melting at 211–217° C.

Example 22.—Preparation of 5-carbethoxy-3-(2,2,2,-trifluoroacetylamino)-2-phenyl - 2,4,5,6-tetrahydropyrrolo[3,4-c]pyrazole Following the procedure outlined in Example 21, 0.27 g. (0.001 mole) of the aminopyrazole was acylated with 2 ml. of trifluoroacetic anhydride. The trifluoroacetyl derivative was recrystallized from methanol to give 0.06 g. (43%) of a crystalline product melting at 194–199° C.

Example 23.—Preparation of 5-carbethoxy - 3 - acetylamino - 2-(m-chlorophenyl)-2,4,5,6-tetrahydropyrrolo[3,4-c]pyrazole Following the procedure outlined in Example 19, 1.53 g. (0.01 mole) of 5-carbethoxy-3-amino - 2-(m-chlorophenyl) - 2,4,5,6-tetrahydropyrrolo[3,4-c]pyrazole was acylated with acetic anhydride. The acetyl derivative on recrystallization from aqueous ethanol weighed 0.94 g. (54%) and melted at 207–211° C.

Example 24.—Preparation of 5-benzoyl-3-amino-2-phenyl-2,4,5,6-tetrahydropropyrrolo[3,4-c]pyrazole The reaction of 1.07 g. (0.005 mole) of N-benzoyl-4- cyano-3-pyrrolidone with 0.72 g. (0.005 mole) of phenylhydrazine hydrochloride by the procedure outlined in Example 1 afforded the desired derivative. On recrystallization from aqueous ethanol the white crystalline product weighed 0.57 g. and melted at 224–228° C.

Example 25.—Preparation of methyl N-(2-cyanoethyl)-2-methyl-alaninate

The base prepared from 40 g. (0.261 mole) of methyl 2-methyl-alaninate hydrochloride by the addition of 16 g. (0.286 mole) of KOH in 25 ml. of water, was treated gradually with cooling with 19.4 g. (0.364 mole) of acrylonitrile. The mixture was heated at 70–80° C. for an hour. The oil which formed was extracted with ether, and the organic layer was dried over anhydrous MgSO₄ and was distilled under diminished pressure. The desired ester weighed 26.1 g. (42%) and boiled at 95–96° C./1 mm.

Example 26.—Preparation of methyl N-carbethoxy-N-(2-cyanoethyl)-2-methyl-alaninate An ice cold mixture containing 8.22 g. (0.045 mole) of methyl N-(2-cyanoethyl)-2-methyl-alaninate, 3.8 g. (0.045 mole) of NaHCO₃ and 15 ml. of water was treated with 4.9 g. (0.045 mole) of ethyl chlorocarbonate. The mixture was stirred for 2 hours and the acylated ester was extracted and distilled. The desired compound weighed 7.8 g. (73%) and boiled at 128–129° C./0.5 mm.

Example 27.—Preparation of N-carbethoxy-2,2-dimethyl-4-cyano-3-pyrrolidone

A mixture containing 9.9 g. (0.045 mole) of the corresponding cyano ester, 2.2 g. (0.045 mole) of sodium methoxide and benzene was refluxed for 3 hours. The resultant sodium salt was separated by filtration, dissolved in water and the pyrrolidone was liberated by acidifying with 50 ml. of 1 N HCl. The crystalline product, 6.5 g. (82%) was recrystallized from ethanol.

We claim:
1. A compound selected from the group consisting of those having the following structure:

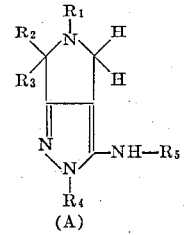

(A)

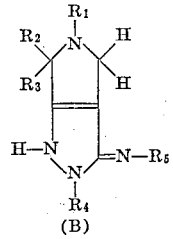 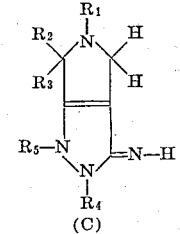

(B) (C)

wherein $R_1$ is selected from the group consisting of lower alkanoyl, lower alkoxycarbonyl and benzoyl; $R_2$ is selected from the group consisting of hydrogen and lower alkyl; $R_3$ is selected from the group consisting of hydrogen and lower alkyl; $R_4$ is pyridyl and $R_5$ is selected from the group consisting of hydrogen, lower alkanoyl, 2,2,2-trifluoroacetyl and 3,4,5-trimethoxybenzoyl; and the non-toxic acid-addition salts thereof.

2. A compound according to claim 1 wherein $R_1$ is carbethoxy; $R_2$ and $R_3$ are hydrogen; $R_4$ is 2-pyridyl and $R_5$ is acetyl.

References Cited

Aebi et al.: Pharm Acta Helv., vol. 38 (7–8), pp. 616–22 (1963).

ALAN L. ROTMAN, Primary Examiner

U.S. Cl. X.R.

260—287, 288, 296, 302, 307, 309.2, 310, 326.3, 465.4; 424—258, 263, 266, 270, 272, 273

UNITED STATES PATENT OFFICE
CERTIFICATE OF CORRECTION

Patent No. 3,526,633                              Dated September 1, 1970

Inventor(s) Shreekrishna Manmohan Gadekar, Bernard Dean Johnson and Elliott Cohen It is certified that error appears in the above-identified patent and that said Letters Patent are hereby corrected as shown below:

Column 1, line 50, "ike" should read -- like --; line 59, "3-jyr-" should read -- 3-pyr- --; line 60, "4-pyridly" should read -- 4-pyridyl --; line 61, "flouro, chloro bromo" should read -- fluoro, chloro, bromo --. Column 2, line 5, "actic" should read -- acetic --; line 14, "arcylo-" should read -- acrylo- --; line 35, that portion of formula (V)

reading 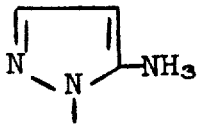   should read 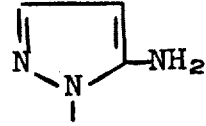

Column 3, line 20, that portion of the second formula reading

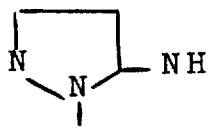   should read 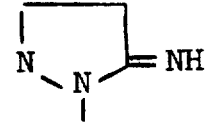

Column 5, line 8, "(0.25 mole) should read -- (0.025 mole) --; line 9, "(.25 mole) should read -- (0.025 mole); line 43, "NaOHH" should read -- NaOH --. Column 6, line 74, "-tetrahydropropyrrolo" should read -- -tetrahydropyrrolo --.

SIGNED AND
SEALED
DEC 8 1970

(SEAL)
Attest:

Edward M. Fletcher, Jr.
Attesting Officer

WILLIAM E. SCHUYLER, JR.
Commissioner of Patents